Figure 1:
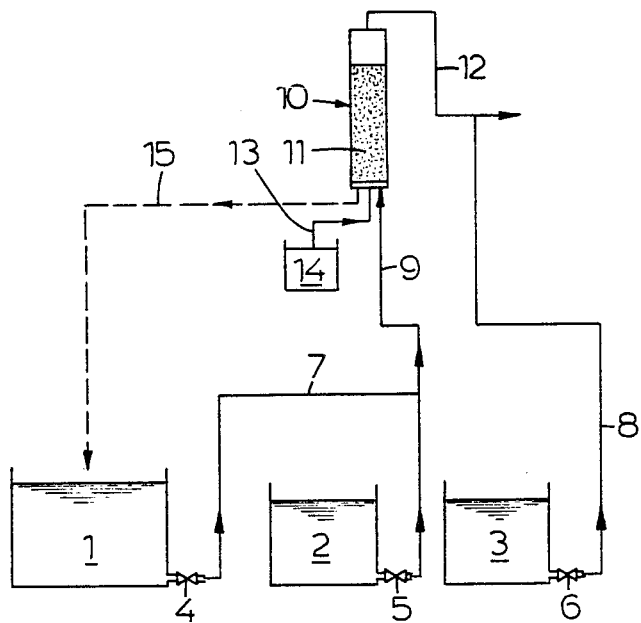
Figure 2:
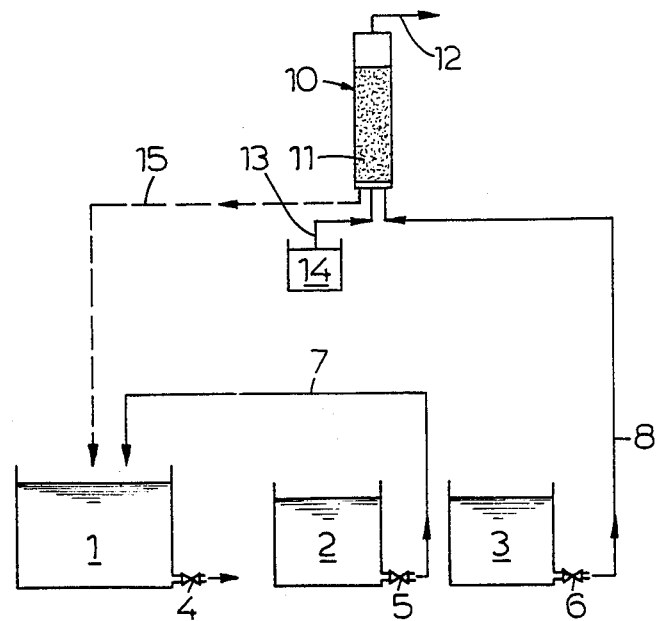

United States Patent [19]

Jansen

[11] Patent Number: 4,764,284

[45] Date of Patent: Aug. 16, 1988

[54] PROCESS FOR REMOVING OF HEAVY METAL FROM WATER IN PARTICULAR FROM WASTE WATER

[75] Inventor: Cornelis W. Jansen, Amersfoort, Netherlands

[73] Assignee: DHV Raadgevend Ingenieursbureau B.V., Ex Amersfoort, Netherlands

[21] Appl. No.: 860,063

[22] Filed: May 8, 1986

[51] Int. Cl.$^4$ .............................................. C02F 1/52
[52] U.S. Cl. ...................................... 210/715; 210/717; 210/724; 210/912; 210/914; 423/35; 423/105; 423/144; 423/165; 423/419 R
[58] Field of Search ............... 210/714, 715, 717, 724, 210/912, 914; 423/35, 92, 105, 144, 165, 419 R, 433, 434; 23/305 R, 305 F

[56] References Cited

U.S. PATENT DOCUMENTS 3,579,443 5/1971 Horst ..................................... 210/715
4,343,706 8/1982 Etzel et al. ........................... 210/912

FOREIGN PATENT DOCUMENTS 50-79169 11/1973 Japan .................................. 210/912

OTHER PUBLICATIONS

Grant, J., ed., *Hackh's Chemical Dictionary*, 4th Edition, 1969, p. 315.
*Metal Finishing*, 52nd Guidebook—Directory Issue 1984, Metals and Plastics Publication Inc., vol. 82, No. 1A. p. 824.

Primary Examiner—Peter Hruskoci
Attorney, Agent, or Firm—Kane, Dalsimer, Sullivan, Kurucz, Levy, Eisele and Richard

[57] ABSTRACT

Process for removing Sr and heavy metals from water in particular from waste water by throughly mixing it with a solution of an alkali metal carbonate and/or hydrogen carbonate in a reactor containing a fluidized bed of suitable bed material. The obtained heavy metal carbonate crystals crystallize onto said bed material and the obtained heavy metal carbonate crystals in granular form are removed from the reactor from time to time.

The heavy metals which may be removed are Ni, Zn, Cu, Fe, Ag, Pb, Cd or Hg.

8 Claims, 1 Drawing Sheet

PROCESS FOR REMOVING OF HEAVY METAL FROM WATER IN PARTICULAR FROM WASTE WATER

A similar process is known from the Netherlands published patent application No. 7108132. Said patent application generally relates to waste water derived from pickling devices.

Calcium carbonate and/or optionally carbon dioxide are added to waste water to be treated. Then lime milk is added to the pretreated waste water, whereupon the waste water is subject to decarbonization. After decarbonization the waste water is filtered in a gravel filter, whereas furthermore prior to the filtration a part of the waste water is passed through a cation exchanger.

According to the prior art method the heavy metals precipitate in the form of carbonates together with their hydroxides. The thus formed granulates are composed both of heavy metal carbonates and heavy metal hydroxides. Apparently the obtained granulates include a substantial amount of water, because said granulates have to be de-watered by means of filter units according to the above-mentioned patent application. After de-watering the same they still have a considerable residual water content of about 10%. Furthermore this patent application shows that the water from which the heavy metals are precipitated should further be purified by means of a gravel filter, from which the contaminents should be removed prior to passing it to the sewer.

The prior art method has a number of serious draw backs to wit that said method is complicated and it requires a number of steps, the obtained granulates contain a substantial amount of water, presumably because said granulates besides the heavy metal carbonates contain heavy metal hydroxides which means that a further de-watering is required and despite this the de-watered granulates still contain about 10% of water. Furthermore the known method has the disadvantage of carry-over of lime milk, etc.

The invention aims now to provide a process, wherein the above-mentioned drawbacks are efficiently removed.

Furthermore it is found that the process of the invention is useful for the production for relative pure heavy metal carbonates from their aqueous solutions.

In order to achieve this the present process is characterized in that said heavy metal containing water is throughly mixed with a solution of an alkali metal carbonate and/or hydrogen carbonate in a reactor containing a fluidized bed of a suitable bed material, whereupon the obtained heavy metal carbonate crystals crystallize and the obtained heavy metal carbonate in granular form is recovered from time to time.

The process according to the invention is simple, wherein in a reactor the heavy metal carbonates crystallize on the bed material, which is in a fluidized state during the process.

The process according to the invention has a number important advantages: the purification may occur within a few minutes, there is no carry-over and a further purification is not required.

Besides that, a very important advantage of the present application is the fact that a granular product is obtained which has a very low water content of about 0.5%. The obtained granular material may be used for various industrial purposes without further de-watering, among other for the recovery of the heavy metals.

Because of this low water content it appears furthermore that the volume of the produced granules is reduced by a factor 50 compared with the conventional prior art.

The present process is for instance very suitable for waste water, derived from galvanization processes, to which however the present process is not limited at all.

According to the invention it is essential that the process is carried out in a fluidized bed of the bed c.q. seed material, which ensures an exclusive crystallization of the heavy metal carbonate. The carbonates are built into the crystal lattice of the seed material. In certain cases, depending on the pH, a heavy metal hydroxy carbonate may crystallize instead of the metal carbonate.

Because of the growth of the metal carbonate crystals it is necessary to remove the obtained granules having a size of 1-3 mm from the reactor from time to time. From these granules the heavy metals may be recovered according to any conventional technique and the same may be added again to the galvanization bath.

It is preferred according to the invention to use sodium carbonate and/or hydrogen carbonate as alkali metal carbonate or -hydrogen carbonate, because the easy availability of these materials. Furthermore potassium carbonate or -hydrogen carbonate may be used too.

As suitable seed material preferably use is made of metal carbonate crystals of the heavy metal to be removed. When for instance as heavy metal zinc is removed, one uses zinc carbonate crystals as seed material.

In starting up the process one may use sand or an other suitable material as bed material. The sand granules in fluidized state may serve as nucleus for the precipitation of the heavy metal carbonate crystals.

The present invention may advantageously be used for removing Sr and the heavy metals such as Ni, Zn, Cu, Fe, Ag, Pb, Cd or Hg.

It should be understood that the conditions during the crystallization of the metal carbonates should be such, that the solubility product of the metal carbonate of interest is exceeded and that metal hydroxides don't precipitate. These conditions are different from heavy metal to heavy metal, since their solubility product is different. The avoidance of heavy metal hydroxy carbonate precipitates is attained through varying the pH depending on the solubility product of the heavy metal carbonates of the heavy metal to be removed. As can be seen in the examples delineated below, in the case of zinc the pH should be 7.5-8.0, whereas in the case of nickel the pH should be 9 and in the case of lead the pH should be 7.5.

It is self-explanatory that when the difference between the solubility of the carbonate salt and the hydroxide salt is sufficiently high, the reaction conditions may be chosen in such a way that the carbonate salt crystallizes but no crystallization occurs of the hydroxide. The difference in solubility is greater at a higher total carbonate concentration ($C_T$).

It is to be noted that the present method is also particularly suited for removing and recovering metals from aqueous concentrates. Since the metal concentrations in that case may be very high one may work at a lower pH.

In practice the favourable process conditions may be obtained by recirculating a solution having a high carbonate concentration ($C_T$) in the reactor containing a fluidized bed. In the reactor the solution to be treated may be injected, wherein the metal carbonates crystallize on the seed material.

The invention will be disclosed in more detail by referring to the schematic diagrams 1 and 2.

Schematic diagram 1 shows the recovery of heavy metals from a galvanic bath and a drag-out bath of a galvanization process, whereas schematic diagram 2 illustrates the removing of heavy metals by means of crystallization from rinsing water of a galvanizing process.

According to schematic diagram 1 the galvanizing bath 1 is through a valve 4, a conduct 7 and a valve 5 connected with a drag-out bath 2. Further a rinse bath 3 is connected with an effluent conduct 12 through a valve 6 and a conduct 8. Said drag-out bath 2 is connected with the reactor 10 through a supply conduct 9, which reactor 10 contains the fluidized bed 11 of the seed material. A tank 14 containing a solution of carbonate and/or hydrogen carbonate is connected with a reactor 10 through a supply conduct 13, whereas the galvanizing bath 1 is in contact with the reactor 10 through the conduct 15. The product to be galvanized is treated in the galvanizing bath 1. Then it is transported in said drag-out bath 2 and finally it is post-rinsed in the rinse bath 3.

In order to remove the heavy metals from the galvanizing bath and from the drag-out bath the liquid present therein is passed to the underside of the reactor 10 through the conducts 7 and 9 respectively. Then the solution of carbonate and/or hydrogen carbonate from the tank 14 is introduced into the reactor 10 through supply conduct 13. The rate of supply of the liquids to be purified and the solution of carbonate and/or hydrogen carbonate should be such, that a fluidized state of the bed c.q. seed material is ensured. The liquids containing the heavy metal and the solution of carbonate and/or hydrogen carbonate are throughly mixed in the reactor 10, wherein the formed heavy metal carbonates crystallize on the bed e.q. seed material. From time to time the formed metal carbonate granules are removed from reactor 10 through the conduct 15 and the heavy metals which are recovered from the granules in a conventional way are added again to the galvanizing bath 1.

The purified galvanization bath liquid and the drag-out bath liquid are then discharged for further treatment, if desired, or to the sewer, together with the rinse water derived from the rinse bath 3, valve 6 and the conduct 8.

The schematic diagram 2 is similar to schematic diagram 1, provided that here the rinse water is purified, by passing it through the valve 6 and the supply conduct 8 to the reactor 10 and mixing it throughly with a solution of carbonate and/or hydrogen carbonate, which is introduced in the reactor from the tank 14 through supply conduct 13. The purified rinse water leaves the reactor through the effluent conduct 12 for instance to a sewer.

The invention will be further illustrated in light of the following examples, to which the process of the invention is not limited at all.

EXAMPLE I

As heavy metal containing waste water a zinc containing water having a zinc concentration of 45 mg/l was used. This waste water was introduced into a fluidized bed reactor with a superficial rate of 40 m/h at a height of the bed material in resting state of 2 m.

In the reactor the waste water was treated at a pH of 7.5–8 with a solution of sodium carbonate having a total concentration of 2 mmol/l. Initially a reduction of the zinc contents of 5–10% was obtained. After increasing the total carbonate concentration up to 10 mmol/l 70–80% of the heavy metal zinc was removed. After further increasing the carbonate concentration to 100 mmol/l, 90–95% of the zinc was removed.

EXAMPLE II

The procedure of example I was repeated provided that as heavy metal containing waste water nickel containing waste water having a concentration of 50 mg/l was used. The pH was 9 and the total carbonate concentration was 50 mmol/l. Herein the nickel concentration in the waste water was reduced to 5 mg/l, which corresponds with a 90% removal.

EXAMPLE III

The procedure of example I was repeated provided that as heavy metal containing waste water lead containing waste water was used with a concentration of 50 mg/l; the pH was 7.5 and the total carbonate concentration was 20 mmol/l. The lead concentration of the waste water was reduced to 1 mg/l, which corresponds with a 98% removal.

I claim:

1. A process for the removal of metals selected from the group consisting of heavy metals and Sr from a metal containing water, thoroughly mixing the metal containing water with an effective amount of an aqueous solution of a carbonate selected from the group consisting of alkali metal carbonate, and alkali metal hydrogen carbonate in a reactor with a fluidized bed of a suitable bed material, upon which material the metal crystallizes exclusively in the form of metal carbonate or metal hydroxy carbonate crystals built into the crystal lattice of the bed material and said crystals grow in substantially pure form on the bed material to form granules having a water content of 0.5% or less, separating a purified water from said reactor, and recovering said granules from said bed.

2. A process according to claim 1, comprising using as said alkali metal carbonate or hydrogen carbonate, sodium carbonate or sodium hydrogen carbonate.

3. A process according to claim 1, comprising using as said alkali metal carbonate or alkali metal hydrogen carbonate, potassium carbonate or potassium hydrogen carbonate.

4. A process according to claims 1, 2 or 3 comprising using as said bed material, metal carbonate of the metal to be removed.

5. A process according to claims 1, 2 or 3 comprising using as said bed material, sand.

6. A process according to claims 1, 2 or 3 wherein said heavy metal is selected from the group consisting of Ni, Zn, Cu, Fe, Ag, Pb. Cd and Hg.

7. A process as claimed in claim 4, wherein said heavy metal is selected from the group consisting of Ni, Zn, Cu, Fe, Ag, Pb, Cd or Hg.

8. A process as claimed in claim 5, wherein said heavy metal is selected from the group consisting of Ni, Zn, Cu, Fe, Ag, Pb, Cd or Hg.

* * * * *